COIN TELEPHONE MOUNTING ASSEMBLY

Filed April 5, 1965 3 Sheets-Sheet 1

INVENTORS.
EDWARD S. ERTL
LESLIE A. HANNULA
BY Parker & Carter
Attorneys.

COIN TELEPHONE MOUNTING ASSEMBLY

Filed April 5, 1965 3 Sheets-Sheet 2

INVENTORS.
EDWARD S. ERTL
LESLIE A. HANNULA
BY Parker & Carter
Attorneys.

COIN TELEPHONE MOUNTING ASSEMBLY

Filed April 5, 1965 3 Sheets-Sheet 3

INVENTORS.
EDWARD S. ERTL
LESLIE A. HANNULA
BY Parker & Carter
Attorneys.

United States Patent Office 3,398,244
Patented Aug. 20, 1968

3,398,244
COIN TELEPHONE MOUNTING ASSEMBLY
Edward S. Ertl, Island Lake, and Leslie A. Hannula, Waukegan, Ill., assignors to Acoustics Development Corporation, Park Ridge, Ill.
Filed Apr. 5, 1965, Ser. No. 445,518
6 Claims. (Cl. 179—189)

ABSTRACT OF THE DISCLOSURE

A security mounting assembly for a coin telephone. A sliding mounting member behind a retainer structure is locked in engagement with studs on the back of a telephone assembly so that unauthorized removal of the telephone is prevented as long as the coinbox remains locked This invention relates to a mounting arrangement for coin telephones and the like, and in particular to a mounting arrangement which prevents removal of the telephone assembly unless the entire assembly is removed from the wall or unless the coinbox is removed first.

Another purpose is a telephone security mounting arrangement used in combination with a tamperproof telephone coinbox.

Another purpose is a telephone mounting arrangement for use on coin telephones or the like in which security studs, extending outwardly from the telephone assembly, are attached in a tamperproof manner to the telephone assembly frame, which in turn is fixed to the wall structure.

Another purpose is a tamperproof telephone mounting arrangement in which the method of installation prevents subsequent removal of the telephone assembly without first removing the coinbox.

Another purpose is a method of installing a coin telephone which prohibits tampering.

Other purposes will appear in the ensuing specification, drawings and claims.

Figures 1, 2, 3:
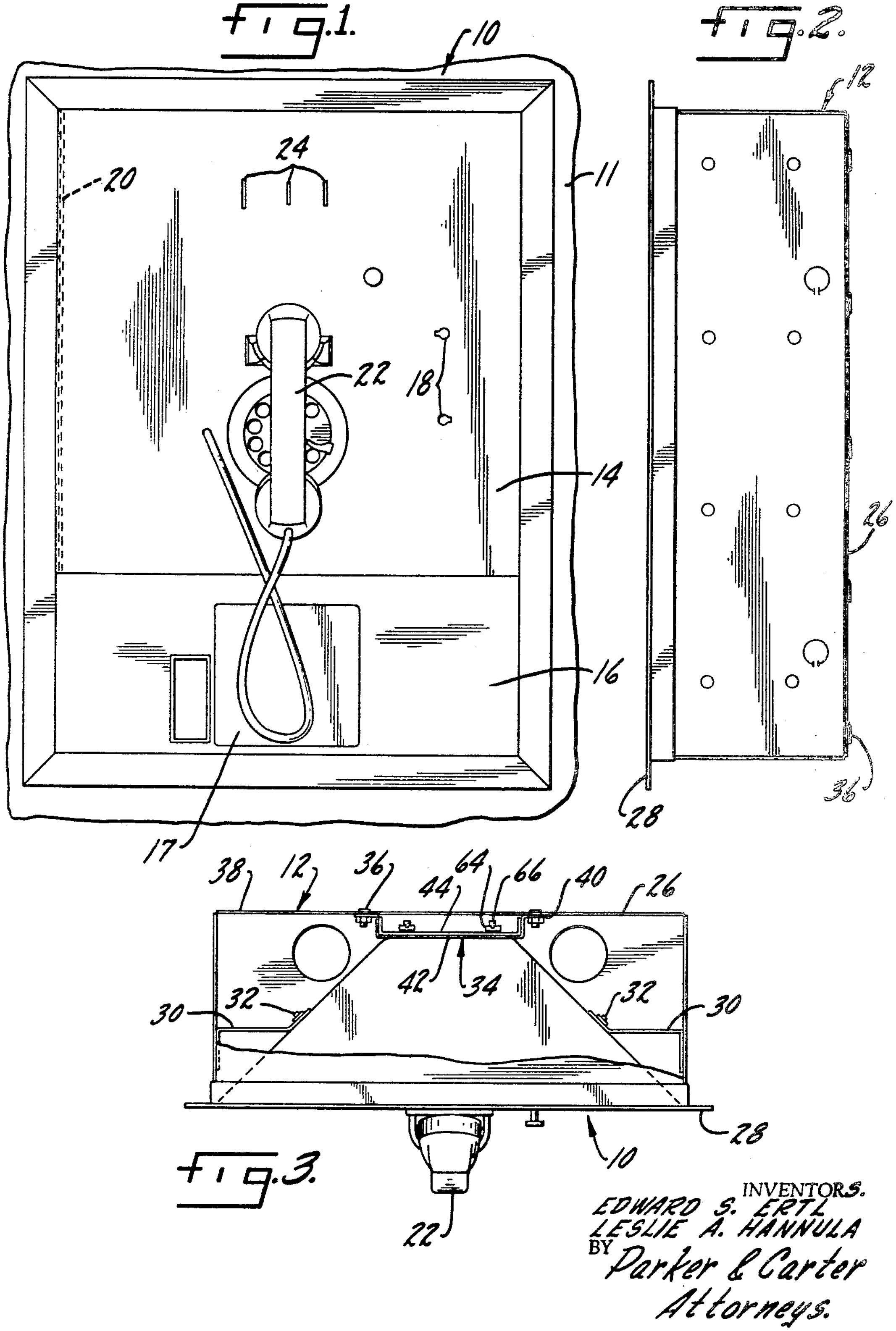

The invention is illustrated diagrammatically in the following drawings wherein:

FIG. 1 is a front view of a telephone mounting arrangement of the type described.

Figure 4:
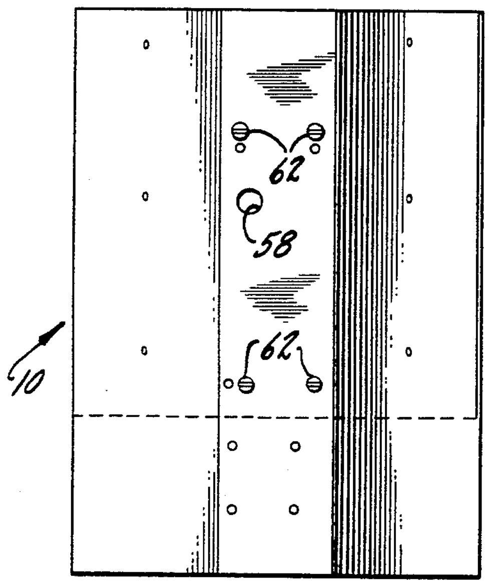
Figures 7, 8:
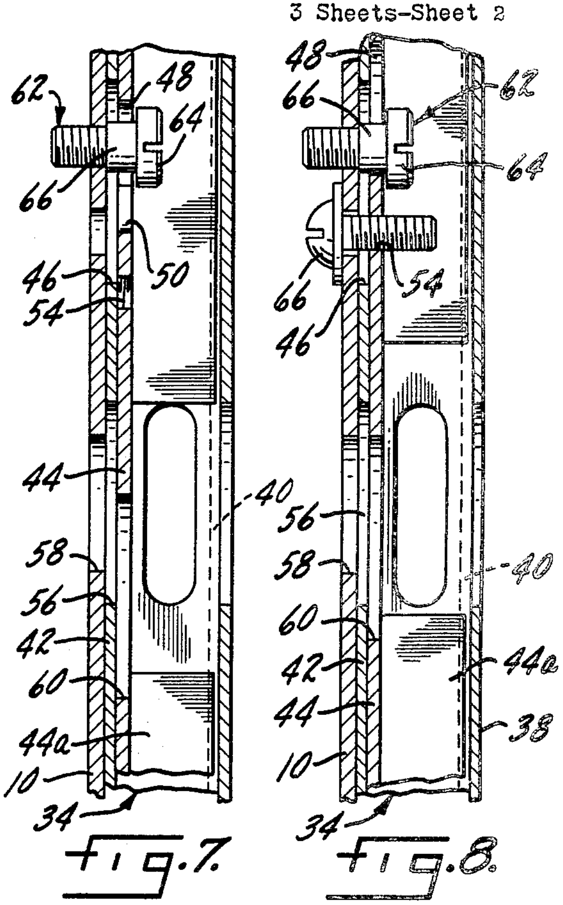
Figure 6:
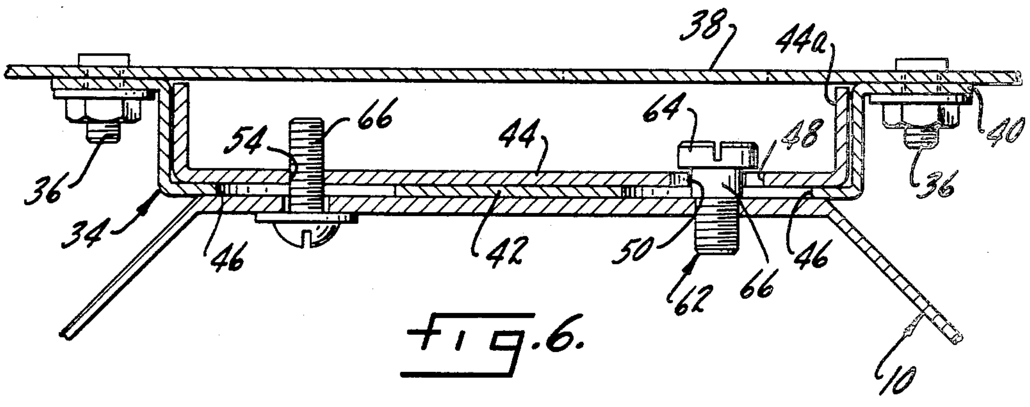
Figure 5:
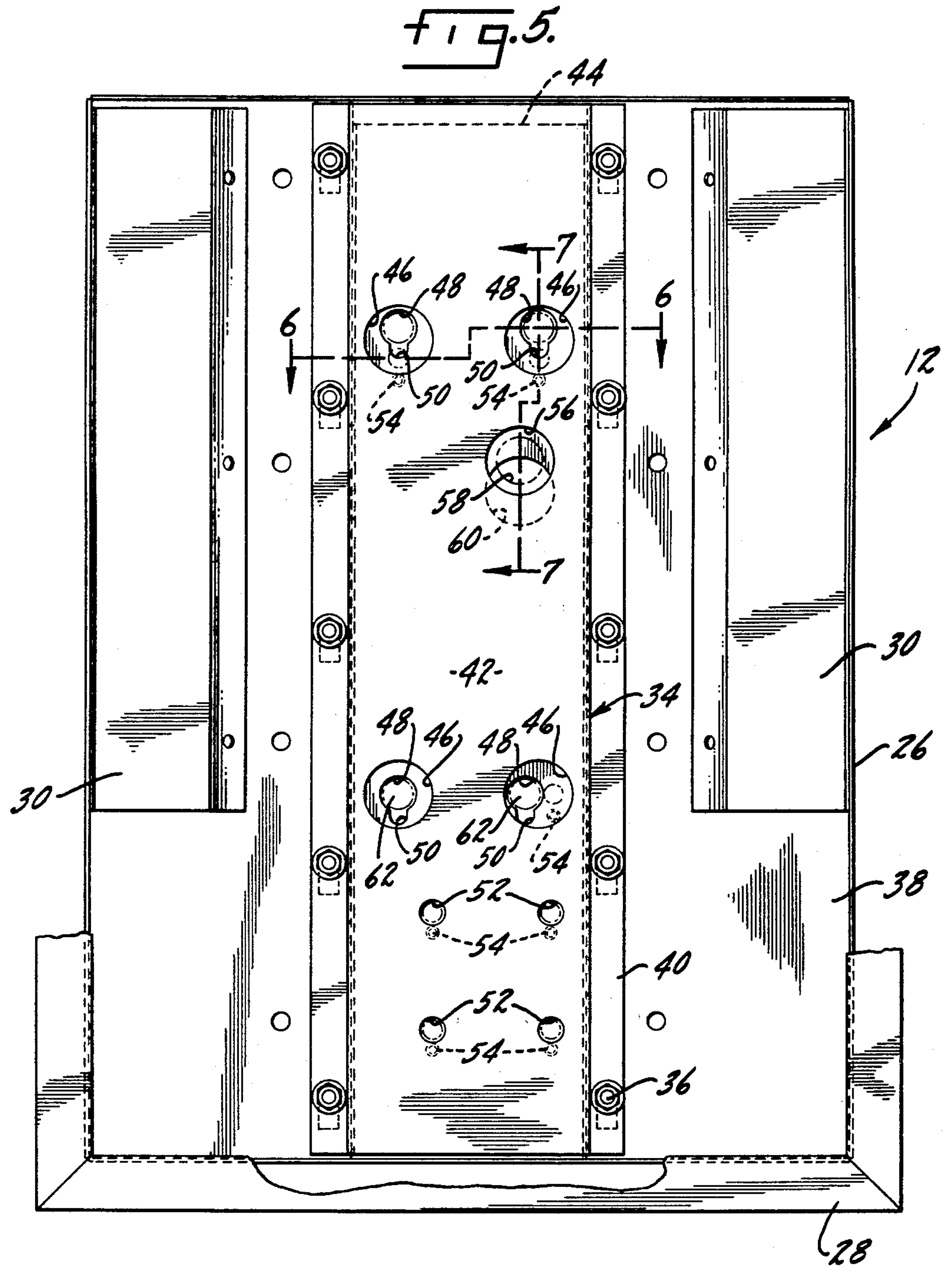

FIG. 2 is a side view of the telephone mounting arrangement illustrated in FIG. 1, but with the telephone assembly removed, FIG. 3 is a top view of the assembly shown in FIGS. 1 and 2, with a portion cut away for clarity, FIG. 4 is a back view of the telephone assembly, FIG. 5 is a front view of the telephone assembly mounting framework, FIG. 6 is a section along plane 6—6 of FIG. 5, and FIG. 7 is a section along plane 7—7 of FIG 5, and FIG. 8 is a section, similar to FIG. 7, but with the mounting fasteners in position.

As shown in FIGS. 1, 2 and 3, the telephone security mounting arrangement may include a coin telephone assembly indicated generally at 10 which is mounted in a metal framework indicated generally at 12. The framework may be mounted in a wall or the like 11. The telephone assembly may include an upper section or a headset section 14 and a lower section 16. A coinbox 17 may be mounted in lower section 16. Access openings 18 in the front of the section 14 may be used to lock or unlock the section 14. A hinge, illustrated in dotted lines at 20 in FIG. 1, pivotally mounts the headset section 14 to the telephone assembly 10. The headset section 14 may be completed by a conventional telephone dial and headset 22 and coin slots 24.

The frame 12 may include a box-like structure 26 which is attached to the wall structure 11, either recessed into the wall or mounted on the front of the wall. As shown herein, the structure is designed to be recessed into the wall and a circumferential flange 28 on the telephone assembly 10 will overlap box 26 and mask it. Secondary mounting brackets 30, on each side of the box 26, may be welded or otherwise secured to the box and extend inwardly for attachment to the telephone assembly 10 by fasteners or the like 32. At the rear of the box 26 is a mounting arrangement consisting of a fixed retainer 34, fastened by fasteners or the like 36 to the rear wall 38 of the box 26. Note particularly FIG. 5. Retainer 34 has flanges 40 which are used in attaching the retainer to the wall 38, and has a forward wall section 42 which extends outwardly from and generally parallel to wall 38. Inside of the space formed by the wall 42 and wall 38 is a slideable mounting member 44 having flanges **44*a* for positioning the plate adjacent wall 42**.

Turning now to FIG. 5, wall section 42 may have a plurality, in this case four, of enlarged openings 46. In alignment with the openings 46 are somewhat smaller openings 48 in slideable mounting member 44, with the openings 48 having a keyhole type slot 50 at their lower edge. Although the keyhole slot 50 is shown at the lower edge of the openings 48, it could be otherwise and the defined open areas formed by the keyhole slots could be any place around the circumference of the openings 48, providing that the sliding member can move in a direction commensurate with the position of the areas 50. Also formed in wall 42 are somewhat smaller mounting holes 52 which, as shown in FIG. 5, are out of alignment with threaded mounting holes 54 formed in the mounting member 44 when the elements are in the position of FIG. 5. Vertical movement of member 44 can place holes 52 and 54 in alignment. An access opening 56 may be formed in the retainer and is in alignment with a somewhat smaller access opening 58 shown in phantom lines in the rear wall of the telephone assembly 10 and an access opening or tool engaging structure 60 formed in sliding member 44. The various openings in FIG. 5 shown in phantom lines are openings in the rear face of the telephone assembly.

Turning now to FIGURES 7 and 8, the first step in assembling the security mounting arrangement is to permanently mount the security stud in the telephone assembly. Next, security stud 62, and there may be one or more, is positioned in the aligned openings 46 and 48. The head 64 of the stud extends through opening 46 and into opening 48 which is just of a size to receive the head. After the security stud has been properly positioned, as shown in FIGURE 7, sliding member 44 is moved upwardly by placing a finger through the access openings 58 and 60. The sliding member is moved upwardly until the shank portion 66 of the security stud is positioned in the defined area or keyhole slot 50 in the member. At this position of the plates, the threaded holes 54 in the sliding member will be in alignment with holes 52 at the bottom of retainer 34 and with openings 46 at the top. Fasteners or the like 66 can then be screwed into the holes 54 to permanently attach the telephone assembly to the framework 12. Note particularly FIGURES 6 and 8 which show the fasteners 66 extending from the telephone assembly, through plate 42 and into member 44.

During the positioning of the stud and the insertion and turning of the fasteners, the headset section 14 is in an open position so that there may be complete access to all of the openings in the back of the telephone assembly. At this stage in the assembly of the unit, the coinbox 17 has not been placed in the unit. After all of the fasteners have been inserted and turned down completely, the coinbox unit 17 is placed in the telephone assembly and attached thereto. Attachment of the coinbox unit is not shown and it is not a part of the present invention. However, the telephone companies have methods of attaching coinboxes so that they are completely tamperproof. Such a method is not shown herein as to some extent the methods of attaching the coinbox are held in a confidential status by the telephone companies to prevent general knowledge of their features being known. For purposes of the present invention, it is sufficient to note that once the coinbox assembly 17 is positioned and attached securely, it cannot be removed except by an employee of the telephone company.

Of particular importance in the invention is the fact that at least one, and as shown herein four, of the fasteners 66 are positioned behind the coinbox unit 17. Accordingly, it is impossible to remove the telephone assembly from the mounting framework 12 unless the coinbox is removed first. Because the coinboxes are so arranged that they can be removed only by telephone company employees it will therefore be impossible to remove the entire telephone assembly from the wall without first removing the coinbox. This is particularly important in that prior coinbox telephones could be removed completely from the wall. In the present situation, this can only be done by cutting out the framework from the wall and there is normally not time for a telephone tamperer to accomplish this.

In summary, the attachment of the telephone assembly begins with the coinbox out and the headset section in the open position. A security stud is used to position the assembly at the proper spot on the retainer. The stud which is permanently attached to the telephone assembly extends outwardly from the telephone assembly and through the two plates. The mounting member is then moved to a position in which it is impossible to remove the telephone assembly from the retainer because the studs have their heads positioned behind mounting member. As covered above their may be one or more security studs. After the mounting member 34 has been positioned such that the security studs cannot be removed, fasteners are used to permanently attach the member 34 and telephone assembly together as a single unit. It is thereafter impossible to remove the telephone assembly without removing all seven fasteners 66. Removal of the lower fasteners is rendered impossible by the tamperproof coinbox section. It is highly important that at least one or more of the fasteners 66 be positioned behind the tamperproof coinbox section.

Whereas the preferred form of the invention has been shown and described herein, it should be realized that there are many modifications, substitutions and alterations thereto within the scope of the following claims.

We claim:

1. For use with a coin telephone assembly including a tamperproof coinbox section, the combination of: a retainer having an access opening, at least one enlarged opening, and a plurality of mounting holes, said telephone assembly having a face adjacent said retainer, an access opening, a plurality of mounting holes, and at least one security stud having a shank and an enlarged head extending outwardly from said face through said enlarged opening; a slideable mounting member positioned adjacent said retainer on the side opposite said face, said mounting member having a plurality of mounting holes and a mounting opening aligned with said stud and sized to receive said stud head, the mounting opening having a defined area of a size to receive the stud shank, but not the head; said access openings being alignd for access to move said mounting member to a position in which the shank of said stud is positioned in the defined area; said respective mounting holes being aligned only when said mounting member has been moved to a position in which the shank of said stud is positioned in said defined area; and a plurality of fasteners positioned in said mounting holes for securing said telephone assembly to said retainer and mounting member, with at least one set of aligned holes and respective fasteners being positioned behind said tamperpoof coinbox section.

2. The structure of claim 1 wherein there are a plulality of aligned openings in the retainer and mounting member for receiving a plurality of security studs.

3. The structure of claim 1 further including a frame, said retainer being attached to said frame, and secondary mounting brackets attached to said frame and to said telephone assembly.

4. The structure of claim 1 wherein said telephone assembly includes a headset section, said headset section being hinged to said telephone assembly, said access openings being positioned in that part of the telephone assembly which is uncovered by pivotal movement of said head section.

5. The structure of claim 1 wherein said retainer has a central flat section with flanges extending outwardly from each side thereof, said mounting member having a flat portion which lies against said retainer flat section and flanges which are positioned adjacent said retainer flanges.

6. For use with a coin telephone assembly having a tamperproof coinbox section, the combination of: a retainer having an access opening, at least one enlarged opening, and a plurality of mounting holes; said telephone assembly having an access opening, a plurality of mounting holes, and at least one security stud extending through said enlarged opening; a slidable mounting member positioned on the side of said retainer opposite the telephone assembly for use in fastening said security stud and said telephone assembly to said retainer, said mounting member having a plurlity of mounting holes; means on the mounting member accessible through the access openings, for moving said member to a position for fastening said security stud to said retainer; said mounting holes being aligned only when said mounting member has been moved to the position in which it fastens said stud to said retainer, and fasteners positoned in said mounting holes for securing said telephone assembly to said retainer and mounting member with at least one of said fasteners being positioned behind said tamperproof coinbox.

References Cited

UNITED STATES PATENTS

| | | | |
|---|---|---|---|
| D. 183,985 | 11/1958 | Hose | D26—14.1 |
| 1,634,884 | 7/1927 | Peer | 248—203 |
| 1,844,557 | 2/1932 | Bobrick | 248—203 |
| 3,213,210 | 10/1965 | Samples | 179—189 |

KATHLEEN H. CLAFFY, *Primary Examiner.*

L. A. WRIGHT, *Assistant Examiner.*